United States Patent
Hämäläinen et al.

(10) Patent No.: US 7,228,143 B1
(45) Date of Patent: Jun. 5, 2007

(54) PAGING OF MOBILE SUBSCRIBER TO ESTABLISH PACKET-SWITCHED CONNECTION

(75) Inventors: Jari Hämäläinen, Kangasala (FI); Jari Vainikka, Vantaa (FI); Hannu Kari, Veikkola (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/539,013

(22) Filed: Mar. 30, 2000

Related U.S. Application Data

(63) Continuation of application No. PCT/FI98/00768, filed on Sep. 29, 1998.

(30) Foreign Application Priority Data

Sep. 30, 1997 (FI) ...................... 973846

(51) Int. Cl.
*H04Q 7/20* (2006.01)
(52) U.S. Cl. .................... 455/458; 455/426.1; 455/515
(58) Field of Classification Search ............. 455/422.1, 455/426.1, 433, 432.2, 434, 461, 552.1, 553.1, 455/560, 561, 414.1, 436, 442, 450, 458, 455/515
See application file for complete search history.

(56) References Cited

U.S. PATENT DOCUMENTS

| | | | |
|---|---|---|---|
| 5,502,721 A | | 3/1996 | Pohjakallio |
| 5,805,587 A | * | 9/1998 | Norris et al. ............... 370/352 |
| 5,943,399 A | * | 8/1999 | Bannister et al. ......... 379/88.17 |
| 5,970,059 A | * | 10/1999 | Ahopelto et al. ........... 370/338 |
| 5,982,774 A | * | 11/1999 | Foladare et al. ............ 370/401 |
| 6,125,177 A | * | 9/2000 | Whittaker ................... 379/243 |
| 6,167,248 A | * | 12/2000 | Hamalainen et al. ....... 455/403 |
| 6,169,734 B1 | * | 1/2001 | Wilson ....................... 370/352 |
| 6,463,146 B1 | * | 10/2002 | Hartley et al. ......... 379/215.01 |
| 6,570,871 B1 | * | 5/2003 | Schneider ................... 370/356 |
| 6,614,772 B1 | * | 9/2003 | Sexton et al. ............... 370/335 |

FOREIGN PATENT DOCUMENTS

WO WO 97/26764 7/1997

OTHER PUBLICATIONS

International Search Report for PCT/FI98/00768.

* cited by examiner

*Primary Examiner*—William Trost
*Assistant Examiner*—James D. Ewart
(74) *Attorney, Agent, or Firm*—Squire, Sanders & Dempsey L.L.P.

(57) ABSTRACT

A method of paging a mobile station to establish a packet-switched connection in a mobile telephone network that supports a circuit-switched connection and a packet-switched connection. To establish a mobile-terminated circuit-switched connection, the mobile telephone network sends the mobile station a page request, as a result of which the mobile station switches to standby mode for a circuit-switched connection. To save the batteries and to reduce the need of processing, the mobile station listens only to the paging channels of the circuit-switched connection. To establish a mobile-terminated packet-switched connection, the mobile telephone network sends the mobile station a page request via a circuit-switched connection and subsequently sends the mobile station the additional information commanding the mobile station to switch to a packet-switched connection. After detecting the additional information, the mobile station switches to the packet-switched connection.

11 Claims, 3 Drawing Sheets

PAGING OF MOBILE SUBSCRIBER TO ESTABLISH PACKET-SWITCHED CONNECTION

This application is a continuation of international application serial number PCT/FI98/00768, filed 29 Sep. 1998.

BACKGROUND OF INVENTION

The invention relates to a mechanism for establishing a call, more particularly to a mechanism for paging a mobile station supporting a circuit-switched and a packet-switched connection in order to establish a packet-switched connection. The invention also relates to a mobile telephone network and to a mobile station.

Mobile systems have been developed because it has been necessary to be able to reach people even when they are not close to a fixed telephone terminal. The use of different data transmission services in offices has increased, and different data services have been simultaneously introduced into mobile systems. Portable computers allow efficient data processing wherever the user is. Mobile networks, in turn, offer the user an efficient access network for mobile data transmission, the access network providing access to actual data networks. Because of this, different new data services are being designed for present and future mobile networks. Mobile data transmission is particularly well supported by digital mobile systems, such as the Pan-European mobile system GSM (Global System for Mobile Communication).

A General Packet Radio Service (GPRS) is a new service in the GSM. It is one of the items that is being standardized in GSM phase 2+ in the ETSI (European Telecommunication Standard Institute). The GPRS operational environment consists of one or more sub-network service areas that are interconnected using a GPRS backbone network. A sub-network comprises a number of packet data service nodes, which are here called GPRS support nodes (or agents) and each one of which is connected to the GSM mobile network so that it can provide packet data service for mobile data terminals via several base stations, i.e. cells. An intermediate mobile network provides circuit-switched or packet-switched data transmission between a support node and the mobile data terminals. Different sub-networks, in turn, are connected to an external data network, for example to a Public Switched Packet Data Network PSPDN. The GPRS service can thus be used for effecting packet data transmission between mobile data terminals and external data networks, when the GSM network functions as an access network. One feature of the GPRS service network is that it operates almost independently of the GSM network. One of the requirements set for the GPRS service is that it must operate together with different types of external PSPDN networks, such as the Internet and X.25 networks. In other words, the GPRS service and the GSM network should be able to serve all users, irrespective of the type of data networks that they wish to be connected to via the GSM network. This means that the GSM network and GPRS service must support and process different network addressing methods and data packet formats. The data packet processing also comprises routing of the packets in a packet radio network. In addition, the users should be able to roam from their home GPRS network to a visited GPRS network.

With reference to FIG. 1, we shall now describe a typical arrangement in a GPRS network. It should be understood that the architecture of the GPRS systems is not as advanced as that of the GSM systems. All GPRS terms should therefore be understood as being descriptive terms rather than limiting ones. A typical mobile station forming a mobile data terminal consists of a mobile station MS of a mobile network and of a portable computer PC connected to the data interface of the MS. The mobile station can be, for example, a Nokia 2110, manufactured by Nokia Mobile Phones Ltd., Finland. By means of a PCMCIA type Nokia Cellular Datacard, manufactured by Nokia Mobile Phones Ltd., the mobile station can be connected to any portable personal computer PC whatsoever that has a PCMCIA card slot. The PCMCIA card thus provides the PC with an access point that supports the protocol of the telecommunications application used in the PC, such as the CCITT X.25 or Internet Protocol IP. Alternatively, the mobile station can directly provide an access point that supports the protocol used by the PC application. Further, a mobile station 3 and a PC 4 can also be integrated to form a single unit, within which the application is provided with an access point that supports the protocol used by it. An example for such a mobile station with an integrated computer is a Nokia Communicator 9000, manufactured by Nokia Mobile Phones Ltd., Finland.

Network elements BSC and MSC are previously known from a typical GSM network. The arrangement of FIG. 1 comprises a separate Serving GPRS Support Node SGSN. The support node controls certain operations of the packet radio service on the network side. The operations include the logging on and off the system by the mobile stations MS, updating of the routing areas of the mobile stations MS, and routing of the data packets to correct destinations. In the present application, the term 'data' should be understood in the wide sense to mean any information whatsoever transmitted in a digital telecommunications system. The information can comprise speech encoded into digital form, data communication between computers, telefax data, short segments of program code, etc. The SGSN node can be located at a base station BTS, at a base station controller BSC or at a mobile switching centre MSC, or it can be separate from all these elements. The interface between the SGSN node and the base station controller BSC is called a GB interface. An area managed by one base station controller BSC is called a Base Station Subsystem BSS.

The intermediate mobile network provides packet-switched data transmission between a support node and mobile data terminal equipment. Different sub-networks, in turn, are connected to an external data network, for example to a PSPDN, via specific Gateway GPRS Support Nodes GGSN. Packet data transmission between mobile data terminals and external data networks is thus effected by means of the GPRS service, while the GSM network functions as an access network. Alternatively, the gateway node GGSN can be replaced with a router. In the following, the term 'gateway node GGSN' is also to be understood as referring to a structure in which the gateway has been replaced with a router.

In FIG. 1 the GPRS network connected to the GSM network comprises a number of serving GPRS support nodes and one gateway GPRS support node GGSN. The different support nodes SGSN and GGSN are interconnected via an intra-operator backbone network. It is to be understood that a GPRS network can comprise any number of support nodes SGSN and gateway nodes GGSN.

Each support node SGSN manages a packet data service in the area of one or more nodes in a cellular packet radio network. To achieve this, each support node SGSN is connected to a certain local of the GSM system, typically to a mobile services switching centre, but in some situations it may be preferable to connect it directly to a base station subsystem BSS, i.e. to a base station controller BSC or a base station BTS. A mobile station MS in a cell communicates with a base station BTS over a radio interface and further through a mobile network with the support node SGSN to the service area of which the cell belongs. In principle, the mobile network between the support node SGSN and the mobile station MS only transmits packets between these two. For this purpose, the mobile network can offer either a circuit-switched connection or packet-switched data packet transmission between a mobile station MS and a serving support node SGSN. An example for a circuit-switched connection between a mobile station MS and an agent is presented in Finnish Patent Application 934 115. An example for packet-switched data transmission between a mobile station MS and an agent is presented in Finnish Patent Application 940 314. It should be noted, however, that a mobile network provides only a physical connection between a mobile station MS and a support node SGSN, and that its exact operation and structure are not relevant to the present invention.

An intra-operator backbone network 11 interconnecting the operator's SGSN and GGSN can be implemented, for example, using a local area network. It should be noted that it is also possible to implement the operator's GPRS network without an intra-operator backbone network, for example, by implementing all the features in a single computer, but this does not cause any changes in the call set-up principles according to the present invention.

A gateway GPRS node GGSN connects the operator's GPRS network to the other operators' GPRS systems and to data networks, such as an inter-operator backbone network 12 or an IP network. An Interworking Function IWF can be arranged between the gateway node GGSN and the other networks, but usually the GGSN is simultaneously the IWF. The inter-operator backbone network 12 is one through which the gateway nodes GGSN of different operators can communicate with one another. The communication is needed to support the GPRS roaming between the different GPRS networks.

The gateway node GGSN is also used to store the location information of the GPRS mobile stations. The GGSN also routes mobile-terminated (MT) data packets. The GGSN also contains a database that associates the mobile station's network address, for example in an IP network or an X.25 network (or simultaneously in more than one network), and the mobile station identifier in a GPRS network. When the mobile station roams from one cell to another within the area of one support node SGSN, location updating is needed only in the support node SGSN, and the gateway node GGSN need not be informed of the change of location. When the mobile station roams from a cell of one support node SGSN to a cell of another SGSN within the area of the same or a different operator, location updating is also performed in the (home) gateway node GGSN so as to store the identifier of the new, visited support node and the identifier of the mobile station.

A GPRS register GR is used to authenticate subscribers at the beginning of a GPRS session. It contains a definition between a subscribers PDP (Packet Data Protocol) address/addresses and the subscriber's IMSI (International Mobile Subscriber Identity). In a GSM network a subscriber is identified on the basis of the IMSI. The GR can be a separate register, or preferably it can be integrated with the home location register HLR of the mobile system. In the figure the HLR/GR is connected through an SS7 (Signalling System 7), for example to a mobile switching centre MSC and an intra-operator backbone network. Between the SS7 signalling system and the intra-operator backbone network there can be a direct connection or an SS7 gateway. In principle, the HLR/GR can exchange packet-switched messages with any GPRS node whatsoever. The HLR/GR's method of communication and its connection to the GPRS network are not, however, essential to the invention. For example, a direct connection to a node is possible, or the GR can be a node of the GPRS network.

In the above arrangement, packet-switched data (in short: packet data) can be transmitted to a mobile station over an air interface, when the mobile station, controlled by the network, has first been directed to a correct kind of channel, i.e. to a packet data transmission channel. A mobile station that supports packet data transmission can either be suited only to the transmission and reception of packet data ('GPRS only') or also to the transmission of conventional circuit-switched speech and other services ('multi-function terminal').

A 'GPRS only' mobile station can be in one of three different modes in the sense of the present application: a ready, a standby or an idle mode. A mobile station in the ready mode is connected to a data transmission channel and is ready to transmit and/or receive data packets. A mobile station in the standby mode listens to a packet data paging channel, and after receiving its paging identifier the mobile station switches to the ready mode. A mobile station in the idle mode does not support transmission nor reception of packet data.

A multi-function terminal operates in the ready and standby modes in the same was as the 'GPRS only' terminal, but in the idle mode it supports conventional circuit-switched services.

When packet data is sent to a mobile station, the data will be routed to the correct GSM-network by routing it via the gateway node GGSN to the support node SGSN in which the location of the mobile station is known. If the mobile station is in the standby mode, its location is known with the accuracy of a Routing Area RA. Correspondingly, if the mobile station is in the ready mode, its location is known with the accuracy of a cell.

A problem in the above arrangement is that when a multi-function terminal is in the idle mode, i.e. when it listens to a paging channel associated with only circuit-switched services, such as a speech service, a mobile-terminated packet-switched connection cannot be established until the mobile station has connected to a channel that supports packet data. The mobile stations are usually designed to listen to only one paging channel at a time (e.g. to prolong the life of the batteries), and the channel is usually a speech service paging channel. The mobile station will not connect to a channel allocated for packet data transmission until necessary. Due to the nature of packet data, the establishment of a packet data connection is quite separate from the establishment of a circuit-switched connection.

BRIEF DESCRIPTION OF INVENTION

It is an object of the invention to provide a method and equipment implementing the method, eliminating the above problems. In particular, the object is to provide a mechanism combining two different mutually independent data transmission mechanisms, i.e. a circuit-switched connection and a packet-switched connection. The objects of the invention are achieved by a method and a system which are characterized by what is stated in the independent claims. The preferred embodiments of the invention are claimed in the dependent claims.

The invention is based on the idea that the mechanism used to establish a circuit-switched connection is supplemented with additional information commanding the mobile station to switch to a packet-switched connection. This simple, general solution poses another problem. The problem is how the mobile services switching centre in whose area the mobile station is roaming can be made to transmit a page provided with the additional information according to the invention. The page notifies the mobile station that it is to switch to standby mode for a packet data connection. Different ways of solving the above problem will be described below in connection with FIGS. 2 to 5.

It is an advantage of the method and arrangement of the invention that they are compatible with previously used paging mechanisms. Conventional mobile stations (e.g. GSM phones) do not regard additional information that they do not understand as interference. The invention does not shorten the life of the batteries, since the mobile station still listens to only one paging channel.

BRIEF DESCRIPTION OF FIGURES

In the following the invention will be described in greater detail by means of preferred embodiments and with reference to the attached drawings, in which.

DETAILED DESCRIPTION OF INVENTION

Figure 1:
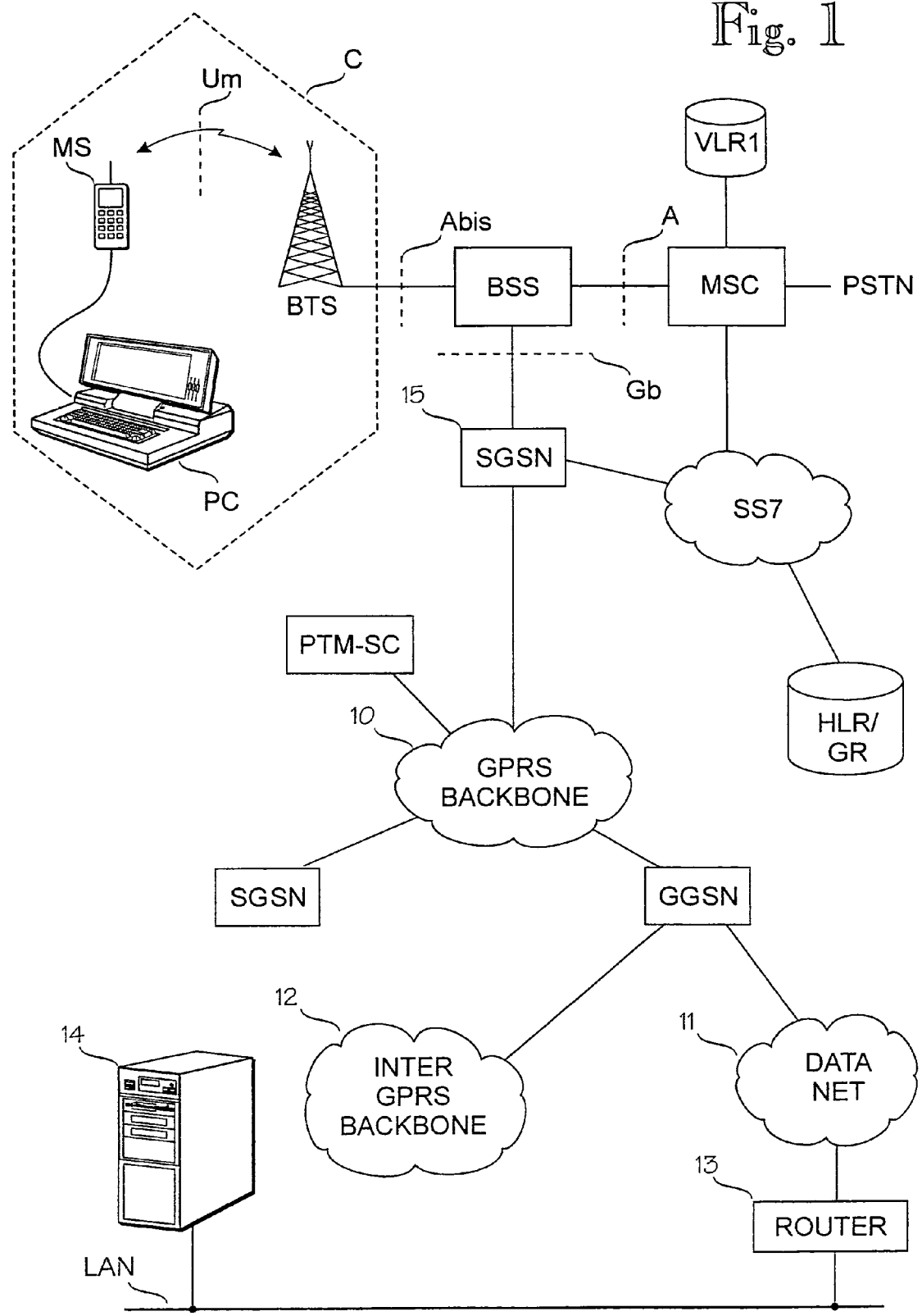
FIG. 1 illustrates the parts of the mobile system that are relevant to the present invention.
Figure 2:
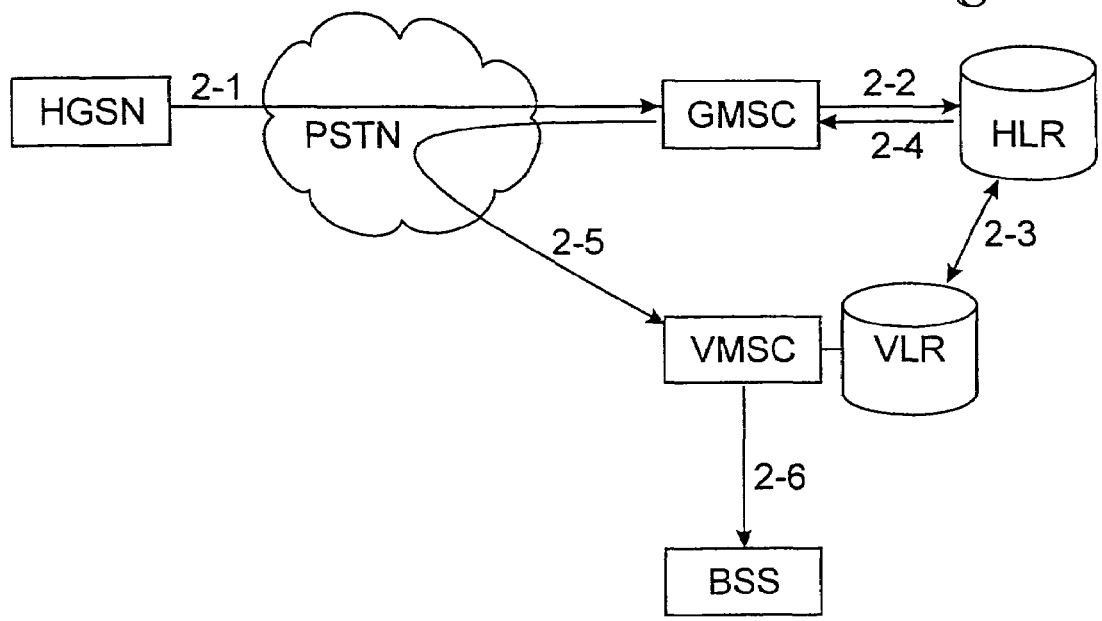
FIGS. 2 to 5 illustrate different embodiments of a call set-up mechanism according to the invention.

With reference to FIG. 2, we shall now describe an embodiment of a call set-up mechanism according to the invention. In step 2-1 a gateway node GGSN detects that packet data is being supplied to a mobile station. The gateway node GGSN knows the identifiers of the mobile station for both a packet-switched and a circuit-switched connection (e.g. a GPRS identifier and an ISDN number). The GGSN establishes a call via a Public Switched Telephone Network PSTN to a GSM type home network of the mobile station, using the ISDN number of the mobile station. In the GSM network the incoming call event is processed in the same way as any other incoming call. In step 2-2 subscriber information is inquired of the home location register HLR, and in step 2-3 the HLR inquires the subscriber's location of the visitor location register VLR. In step 2-4 the subscriber's location is transmitted to a gateway MSC, i.e. GMSC. In step 2-5 the GMSC sends a call set-up request to a visited MSC, i.e. VMSC, which in step 2-6 forwards the call set-up request to a base station system BSS.

The messages sent in steps 2-1 to 2-6 include the additional information according to the invention forwarded by the GMSC to the VMSC. The VMSC interprets the additional information to mean that a packet-switched call is being supplied to the mobile station, and the VMSC therefore transmits via the base station system BSS to the mobile station MS a page that can be otherwise conventional but comprise additional information that commands the multi-function terminal to switch to standby mode for a packet-switched connection. When the VMSC has sent the page, it releases the connection backward toward the GGSN in accordance with the prior art.

Figure 3:
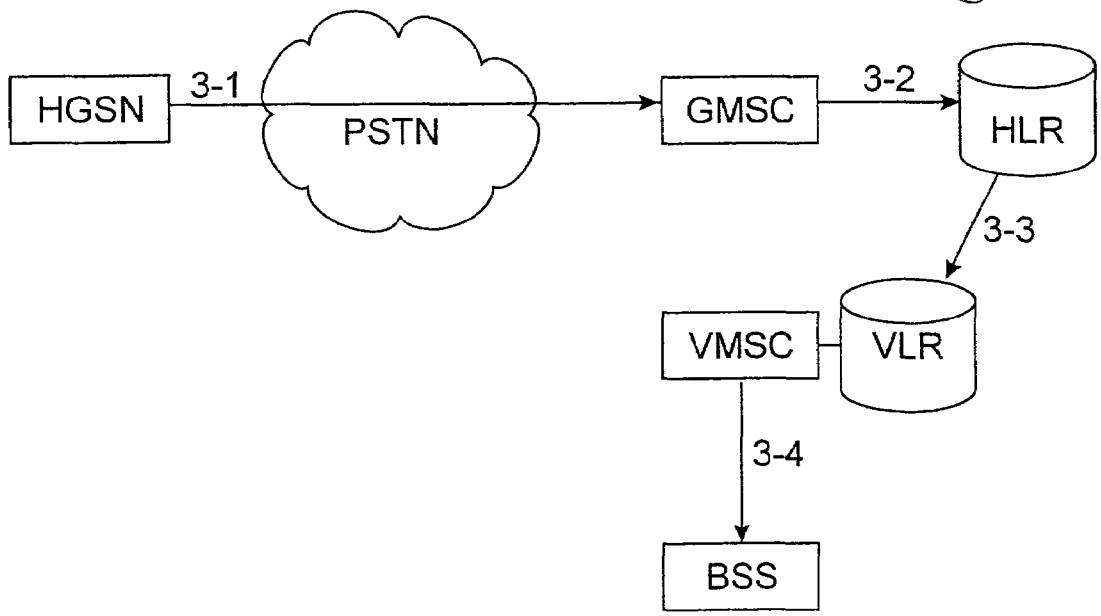

With reference to FIG. 3, we shall now describe an alternative call set-up mechanism. Step 3-1 corresponds to step 2-1 described in connection with FIG. 2. In step 2-2 the GMSC processes the incoming call event and detects the additional information contained in the call set-up request. The GMSC requests the home location register HLR for the roaming number MSRN of the mobile station, and in step 3-3 the HLR inquires the same of the visitor location register VLR, but these messages include the additional information according to the invention. In step 34 the VMSC forwards the call set-up request to the base station system BSS. The additional information according to the invention included in this message contains a command for the multi-function terminal to switch to standby mode for a packet-switched connection in the same way as in step 2-6 of FIG. 2.

In an alternative embodiment, the call in steps 2-1 and 3-1 is not started in the GGSN but in the SGSN.

Figure 4:
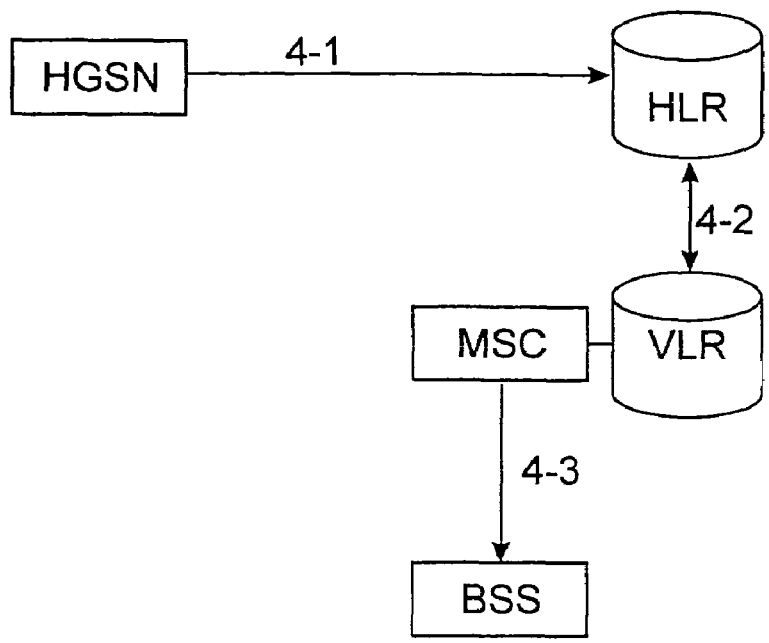

FIG. 4 illustrates an alternative call set-up mechanism. In step 4-1 the GGSN detects that packet data is being supplied to the mobile station. The GGSN knows the identifiers of the mobile station both for a packet-switched and for a circuit-switched connection (e.g. a GPRS identifier and an ISDN number). The GGSN sends the home location register HLR an MAP message transmitted in conventional call establishment from the GMSC. In other words, it requests for a roaming number from the HLR using the normal set-up procedure for an incoming call. In step 4-2 the HLR inquires the same of the VLR. These messages include the additional information according to the invention. When the visitor location register VLR receives the additional information from the HLR, it supplements the page request sent by the VMSC in step 4-3 with the additional information according to the invention, the information commanding the multi-function terminal to switch to standby mode. In an alternative embodiment, the procedure begins in the GGSN rather than in the SGSN.

Figure 5:
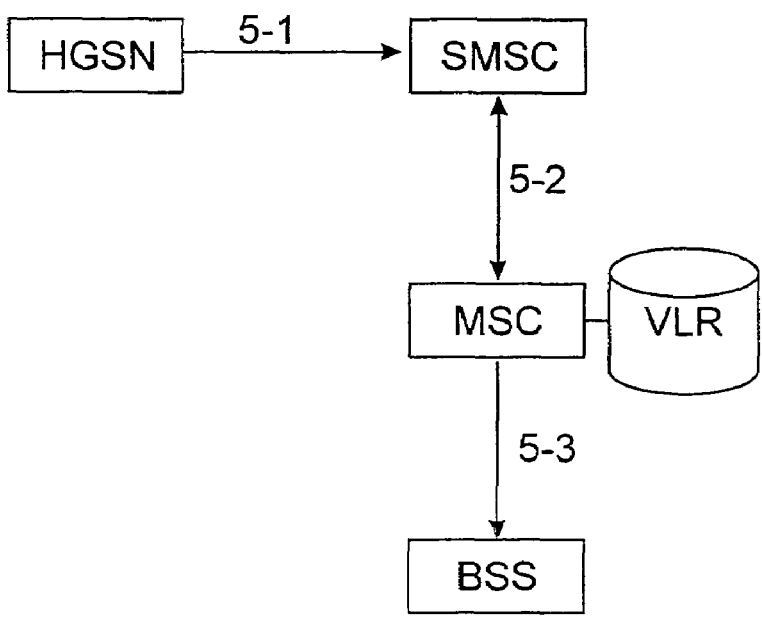

FIG. 5 illustrates another alternative call set-up mechanism. In step 5-1 the GGSN detects that packet data is being supplied to the mobile station. The GGSN knows the identifiers of the mobile station both for a packet-switched and for a circuit-switched connection (e.g. a GPRS identifier and an ISDN number). The GGSN sends the Short Message Service Centre SMSC a notification indicating that a short message that contains a command to switch to standby mode should be transmitted to the multi-function terminal. In step 5-2 the short message service centre sends a short message to a mobile services switching centre MSC in a manner known per se, and in step 5-3 the MSC sends the message to the base station system BSS and further to the mobile station MS. In response to the short message, the mobile station switches to standby mode.

The additional information commanding the mobile station to switch to a packet-switched connection can be transmitted even before the switch to a speech mode on a known paging channel provided with the additional information. Alternatively, the additional information can be transmitted during the speech connection on a paging channel known per se. Particularly suitable paging channels are FACCH and SACCH channels.

The invention provides a relatively simple mechanism for switching a multi-function mobile station (supporting both circuit-switched and packet-switched connections) to standby mode for a packet-switched connection. The invention does not shorten the life of the mobile station batteries as compared with a known single-function mobile station. Further, the invention does not require that the multi-function terminal should have a parallel processing capacity (be able to listen to two channels simultaneously). The invention can be implemented using known equipment, by changing or supplementing the software.

It will be obvious to those skilled in the art that with the introduction of technical advances, the basic idea can be implemented in many different ways. The invention and its embodiments are thus not limited to the above examples but can vary within the scope of the claims.

The invention claimed is:

1. A method of paging a mobile station to establish a packet-switched connection in a mobile telephone network the method comprising:
   sending from the mobile telephone network to the mobile station a page request to establish a mobile-terminated circuit-switched connection, and
   in response to said page request, the mobile station switching to standby mode for a circuit-switched connection,
   the mobile station listening only to the paging channels of the circuit-switched connection,
   to establish a mobile-terminated packet-switched connection, the mobile telephone network sending the mobile station a page request via the circuit-switched connection and sending the mobile station additional information commanding it to switch to a packet-switched connection, and
   in response to the additional information, the mobile station switching to the packet-switched connection,
   wherein the mobile telephone network supports the circuit-switched connection and the packet-switched connection.

2. A method as claimed in claim 1, further comprising sending the page request as follows:
   forming a node knowing the identifiers of the mobile station for both a packet-switched and a circuit-switched connection,
   detecting in response to said node that packet data is being supplied to the mobile station, the node establishes a call via a public switched telephone network and a gateway mobile switching center to the home network of said mobile station using the ISDN number of the mobile station,
   requesting, in the home network of the mobile station, information on the mobile station from a home location register, the home location register in turn inquiring the mobile station's location from a visitor location register,
   forwarding the mobile station's location via the gateway mobile switching center and the public switched telephone network to a visited mobile switching center, the visited mobile switching center sending a call set-up request to the base station system.

3. A method as claimed in claim 1, further comprising sending the page request as follows:
   forming a node knowing the identifiers of the mobile station for both a packet-switched and a circuit-switched connection,
   detecting, in response to said node that packet data is being supplied to the mobile station, the node establishing a call via a public switched telephone network and a gateway mobile switching center to the home network of said mobile station using the ISDN number of the mobile station,
   detecting, in response to said gateway mobile switching center the additional information contained in the call set-up request, the gateway mobile switching center inquiring the mobile station's roaming number from the home location register and in response to the inquiry, the home location register inquiring the same from the visitor location register,
   sending, in response to the roaming number inquiry addressed to the visitor location register, a mobile switching center associated with said visitor location register a call set-up request to the base station system.

4. A method as claimed in claim 1, further comprising sending the page request as follows:
   forming a node knowing the identifiers of the mobile station for both a packet-switched and a circuit-switched connection,
   detecting in response to said node, that packet data is being supplied to the mobile station, the node establishing a call via a public switched telephone network and a gateway mobile switching center to the home network of said mobile station using the ISDN number of the mobile station,
   detecting, in response to said gateway mobile switching center the additional information contained in the call set-up request, the gateway mobile switching center sending to a short message service centre a message indicating that a short message containing a command to switch to standby mode should be sent to the mobile station,
   sending, in response to the message sent by the gateway mobile switching center, by the short message service centre, a short message via the mobile switching center and the base station system to the mobile station, and
   switching, in response to said short message, the mobile station to standby mode for a packet-switched connection.

5. A method as claimed in claim 1, wherein said additional information is sent to the mobile station on a paging channel.

6. A method as claimed in claim 5, wherein said additional information is sent during an on-going call.

7. An arrangement for paging a mobile station to establish a packet-switched connection, the arrangement comprising:
   a mobile telephone network configured to send a mobile station a page request to establish a mobile-terminated circuit-switched connection; and
   a mobile station, wherein in response to said page request, the mobile station is configured to switch to standby mode for a circuit-switched connection;
   wherein, to establish a mobile-terminated packet-switched connection, the mobile station is further configured to listen to paging channels only on the circuit-switched connection,
   wherein the mobile telephone network is further configured to send the mobile station a page request via the circuit-switched connection and to send the additional information to the mobile station, and
   the mobile station is configured to switch to a packet-switched connection in response to said additional information,
   wherein the mobile station establishes the packet-switched connection in the mobile telephone network that supports the circuit-switched connection and the packet-switched connection.

8. A mobile telephone network that supports a circuit-switched connection and a packet-switched connection, wherein the mobile telephone network is configured to:
   send a mobile station a page request via a circuit-switched connection to establish the mobile-terminated packet-switched connection, and
   send the mobile station the additional information to switch the mobile station to the packet-switched connection, wherein the mobile telephone network is configured to send the mobile station the page request to establish a mobile-terminated circuit-switched connection.

9. A mobile station that supports a circuit-switched connection and a packet-switched connection, wherein the mobile station is configured to:
   listen only to a paging channel of the circuit-switched connection,
   monitor additional information sent on said circuit-switched connection, and
   switch to the packet-switched connection in response to said additional information,
   wherein the paging channel is configured to page the mobile station associated at least with the circuit-switched connection.

10. An arrangement for paging a mobile station to establish a packet-switched connection, the arrangement comprising:
   a mobile telephone network comprising
   a sending means for sending a mobile station a page request to establish a mobile-terminated circuit-switched connection;
   wherein the sending means is further configured to send the mobile station a page request via the circuit-switched connection and to send the additional information to the mobile station, and
   and
   wherein the mobile station comprises a switching means for switching to switch to standby mode for a circuit-switched connection in response to said page request;
   wherein, to establish a mobile-terminated packet-switched connection, the mobile station further comprises a listening means for listening to paging channels only on the circuit-switched connection,
   wherein the switching means switches to a packet-switched connection in response to said additional information, and
   wherein the mobile station further comprises an establishing means for establishing the packet-switched connection in the mobile telephone network that supports the circuit-switched connection and the packet-switched connection.

11. A mobile telephone network for supporting a circuit-switched connection and a packet-switched connection, the mobile telephone network comprising:
   a first sending means for sending a mobile station a page request via the circuit-switched connection to establish the mobile-terminated packet-switched connection, and
   a second sending means for sending the mobile station the additional information to switch the mobile station to the packet-switched connection,
   wherein the mobile telephone network sends the mobile station the page request to establish a mobile-terminated circuit-switched connection.

* * * * *